United States Patent [19]

Ranc et al.

[11] Patent Number: 5,151,126
[45] Date of Patent: Sep. 29, 1992

[54] CEMENT-BASE INJECTION GROUT FOR CONSOLIDATING STRUCTURES

[75] Inventors: Roger Ranc, Le Teil; Armand Brisset, Le Mee-sur-Seine; Marcel Debos, Viviers, all of France

[73] Assignee: Lafarge Nouveaux Materiaux, Montrouge, France

[21] Appl. No.: 565,924

[22] Filed: Aug. 10, 1990

[30] Foreign Application Priority Data

Aug. 11, 1989 [FR] France ................... 89 10836

[51] Int. Cl.$^5$ ............... C04B 24/00; E04G 23/02
[52] U.S. Cl. ................... 106/719; 106/816; 52/744; 405/266; 405/267; 405/268
[58] Field of Search ........... 106/719, 816; 52/744; 405/266, 267, 268

[56] References Cited

U.S. PATENT DOCUMENTS

| 2,053,562 | 7/1939 | Jorgensen | 405/266 |
| 3,582,375 | 6/1971 | Tragesser, Jr. | 405/266 |
| 3,774,683 | 11/1973 | Smith et al. | 405/266 |
| 3,891,454 | 6/1975 | Cunningham et al. | 106/719 |
| 4,125,160 | 11/1978 | Crinkelmeyer et al. | 106/719 |
| 4,129,449 | 12/1978 | Kojima | 405/266 |
| 4,160,674 | 7/1979 | Sawyer | 106/816 |
| 4,187,118 | 2/1980 | Nakagawa et al. | 106/719 |

FOREIGN PATENT DOCUMENTS

| 57-102986 | 6/1982 | Japan | 405/266 |
| 60-199118 | 10/1985 | Japan | 405/268 |

*Primary Examiner*—Karl Group
*Assistant Examiner*—Anthony J. Green
*Attorney, Agent, or Firm*—Curtis, Morris & Safford

[57] ABSTRACT

The invention relates to a cement-based injection grout for filling-in and consolidating fine cracks.

According to the invention, the injection grout is produced from a finely ground Portland cement with removal of all the particles of sizes greater than 30 microns, the said cement having added to it a water-reducing plasticizer or thinner in a proportion not exceeding 2% and being mixed with water, the weight ratio of the quantity of water to the quantity of cement not exceeding 0.6.

13 Claims, 4 Drawing Sheets

CEMENT-BASE INJECTION GROUT FOR CONSOLIDATING STRUCTURES

OBJECT OF THE INVENTION

The invention relates to a cement-based grout capable of being employed for filling in and consolidating, by injection, concrete structures affected by fine cracks considered to be passive or the regeneration of spongy or cavernous concrete.

Cracks which are more or less extensive in width and in depth develop occasionally in concrete structures with the passage of time. Those which are merely superficial impart an unattractive appearance to the constructions which they affect, but are of no danger to the durability of the structure. A simple rendering or coating can change this appearance. In the case of deep cracks, however, they may involve the safety of the construction and consequently that of people, for example in the case of bridges or dams. If such cracks are not repaired, the deterioration continues owing to physical or chemical erosion and can ultimately make it necessary to demolish and rebuild the structure in question.

BACKGROUND OF THE INVENTION

To avoid having to be reduced to such an eventuality it has already been thought of to apply to cracked structures the injection technique which has been employed for a long time for consolidating soils and terrain. In fact, by injecting under pressure into the cracks a product which is sufficiently fluid to enable it to enter within the structure, it is possible to fill the internal cracks and cavities so as to fill them in and even to consolidate the structure if the injected product exhibits good adhesiveness and strength properties.

Thermoplastic or heat-curable resins, such as polymers, which offer a very wide viscosity range enabling them to enter very fine cracks, have been employed hitherto in most cases to repair concrete structures by injection. However, such products exhibit disadvantages. First of all, their cost is high and makes a large-scale intervention very expensive. Above all, however, their elasticity modulus after curing is very different from that of concrete, and this creates hard spots which may be detrimental to the whole. In addition, their expansion coefficient is also different from that of concrete, and this presents an obvious disadvantage in the case of structures which are generally situated in the open air and are consequently subject to large temperature variations.

Attempts have therefore been made to employ other products and, in particular, those which were already being employed for consolidating and waterproofing soils. For example, patent application GB-2,195,138 describes an apparatus and a process which can be employed for injecting a curable product into cracks, it being possible for the injected product to be a polyester or epoxy resin or else a cement grout. However, the injection of cracks with a width of less than 2 mm is not envisaged.

As a general rule, the use of cement-based grouts to consolidate concrete structures is particularly advantageous since the injected product is, if not identical, in any case similar to that of the structure to be repaired and therefore exhibits an elasticity modulus and an expansion coefficient of the same order.

A major difficulty is encountered, however, as soon as the width of the crack or of the cavity opening becomes quite small. In practice, when commercial cements are employed, it is found that, if the width of the crack is less than 3 mm, a dewatered cement plug is formed as soon as the grout has entered the first centimeters, making it possible to pursue the operation.

To measure the performance of an injection product a standardized test has been developed, known as "sand column injectability test in dry and wet environment", forming the subject of NF Standard P 18-891. In such a test the time taken by the product being tested to reach the different marked lines placed along a transparent plastic column filled with calibrated sand is measured. The injectability properties of various cement grouts can thus be determined.

Such tests, carried out systematically on different products, have made it possible to ascertain that a cement grout could be injected only into holes or interstices whose width is at least 1.5 to 2.3 times the size of the largest cement particles.

Experience has shown, however, that, even when the size of the largest particles is restricted to the mentioned value, there was no hope of injecting cracks of less than 1 mm with a cement grout.

Now, in many cases it would be advantageous to be able to consolidate much finer cracks. It is obviously preferable, in fact, to intervene as soon as it is noticed that cracks have formed, before they widen. Furthermore, if the work is to be carried out on a road or on a structure in the open air, it is better to do this in the summer or in the spring, that is to say at a time when, because of the expansions, the cracks have closed up. In fact, the cracks are wider in winter, but at that time the days are shorter and, above all, there are risks of frost, especially at night.

BRIEF DEFINITION OF THE INVENTION

The object of the invention is therefore a cement-based grout making it possible to consolidate by injection structures which are affected by cracks which may be very fine, it being possible in practice for such a grout to be employed starting with a width of 0.2 or 0.3 mm.

In accordance with the invention, the injection grout is made from a finely ground Portland cement from which all the particles of a size greater than 30 microns have been removed, the said cement having added to it a water-reducing plasticizer or thinner in a proportion which may be less than 2%, and being mixed with water, the weight ratio of the quantity of water to the quantity of cement not exceeding 0.6.

In what follows, the usual cement industry nomenclature will be employed, with C3A denoting the tricalcium aluminate $3CaO.Al_2O_3$ and C4AF denoting tetracalcium alumino ferrite $4CaO.Al_2O_3.Fe_2O_3$.

The Portland cement employed preferably contains not more than 5% of C3A and the sum 2C3A+C4AF does not exceed approximately 20%, and this additionally endows it with a good resistance to sulfates (ASTM type V).

In a particularly advantageous manner the plasticizer is a product chosen from a group comprising polynaphthalenes, melamines and lignosulfonates, the proportion of plasticizer being between 0.5% and 1.8% by weight of the total of dry product.

Furthermore, still better results are obtained if the proportion of mixing water relative to the cement is limited to at most 0.40.

In some cases the quantity of cement can be reduced by virtue of the addition of a fine binding product such as pozzolanas, finely ground slags, silica gel, thermal silica or organic products, such as polyurethane, alcohol or polyvinyl acetate resins, etc., in a proportion of 0.5 to 10% by weight of the total of dry product. In the case of resins or other liquid or redispersable powder additives, these may be added to the mixing water.

However, the invention will be understood better from the detailed description of some particular examples of embodiment, illustrated by the attached drawings.

DETAILED DESCRIPTION OF THE INVENTION

Figure 1:
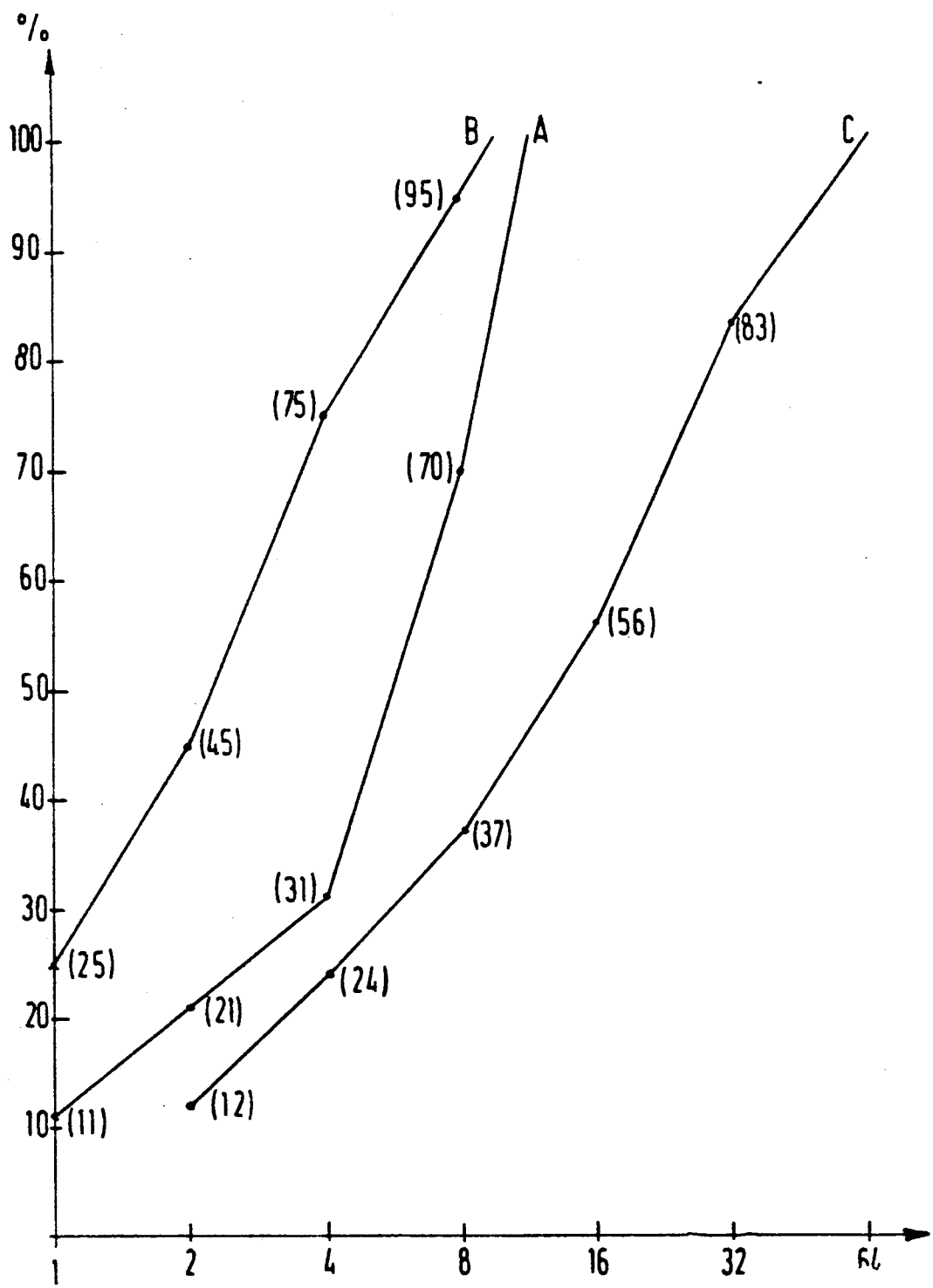
FIG. 1 shows the particle size distribution curves of a number of cements subjected to the injectability tests.

As indicated above, it was accepted hitherto that only cracks of a width of at least 1 mm could be consolidated by injecting a cement grout.

Contrary to this common opinion, the inventors have satisfactorily concluded research to try and develop cement grouts capable of being injected into much finer cracks and has finally succeeded in treating cracks starting with a width of the order of 0.2 to 0.3 mm, that is to say much narrower than the widths accepted hitherto.

Research of this kind was made more difficult by the fact that the characteristics which can be modified, such as the composition of the cement, its fineness, the W/C ratio and the proportions of additives, are numerous and interfere with each other.

It is known, in particular, that a relatively high proportion of water, whilst obviously making the injection easier, can give rise to sweating and, consequently, destabilization of the grout, it being possible to define the optimum injectability as a compromise between the fluidity and the stability of the water/cement emulsion.

It has therefore been possible to emphasize the fact that the maximum size of the cement particles must be limited even more than had been thought.

In fact, while the hitherto accepted ratio of the minimum width of the cracks to the maximum size of the particles was at most 5 and even lower, in certain cases, it was found that, to obtain good results, it was necessary to remove as completely as possible the particles of sizes greater than 30 microns, and, better, not to exceed, preferably 10 to 12 microns, which corresponds to a minimum ratio of 16 instead of 5 in the case of injection of cracks of 0.2 to 0.3 mm.

It has been possible to establish that the minimum width of the cracks capable of being filled in using a grout according to the invention could go up to 10 to 15 times the maximum particle size.

It was discovered, moreover, that the nature of the cement was also important, not all cements being suitable for injection in very fine cracks.

In fact, to obtain the results sought after, a Portland cement, preferably containing at most 5% of dry tricalcium aluminate, must be employed.

The W/C ratio must also be lower than that at which the operation was carried out previously in the case of injection grouts, since it must be at most 0.6 and preferably of the order of 0.4 or less.

To preserve the necessary fluidity with a W/C ratio as low as this, a water-reducing plasticizer or thinner, such as a polynaphthalene, a melamine or a lignosulfonate is added to the cement, but in a very small proportion. It has been found, in fact, that it was possible to conform to a W/C ratio limited to 0.40 by using a quantity of plasticizer which could be less than 2% of the quantity of cement and could even go down below 1%. It is also possible to add to the cement very fine secondary constitutents such as pozzolanas, slags or silica, as well as resins, in a proportion of 0.5% to 10%.

But, in some cases and with some plasticizer (melamine, lignosulfonate) it could be advantageous to increase the W/C ratio up to 0.45–0.50 by using up to 5% of plasticizer.

In order to emphasize the advantages of the invention, comparative tests were carried out, to which were subjected, on the one hand, a grout A corresponding to the characteristics of the invention thus defined and, on the other hand, an injection grout B produced in conventional manner from a commercial cement.

The principal characteristics of the cements and of the grouts produced are found in Table A below.

TABLE A

Figure 2:
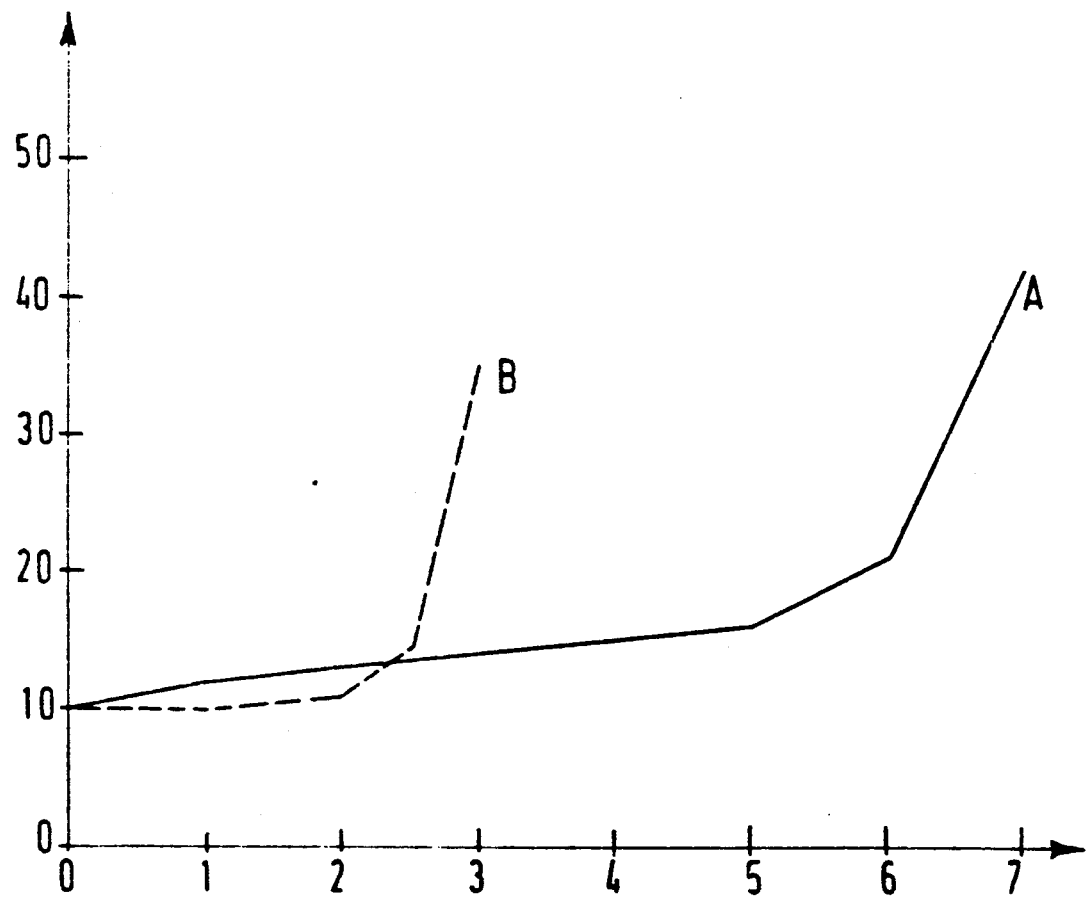
FIG. 2 is a diagram of the practical useful life (PUL) of two cement grouts subjected to the tests.

| Characteristics | A | B |
| --- | --- | --- |
| Nature of the cement | Portland cement | Slag cement |
| Volumic Mass (T/m$^3$) | 3.12 | 2.80 |
| Specific surface (cm$^2$/g) | 7000 | 17000 |
| Particle size distribution | According to graph FIG. 1 | |
| W/C | 0.40 | 1.6 |
| PUL | According to graph FIG. 2 | |
| Tensile strength TS 28 (MPa) | 10 | 1.5 |
| Compressive strength CS 28 (MPa) | 115 | 9 |
| Shrinkage (micron/m) (28 d) | 4300 | not measured |
| Swelling (micron/m) (28 d) | 40 | not measured |
| Porosity (%) | 1% | 65% |

Furthermore, the particle size distribution curves of the cements employed for grouts A and B are shown in FIG. 1, to which has been added the particle size distribution curve of an ordinary cement C.

The grout A according to the invention is produced from a finely ground Portland cement from which the particles of sizes greater than 16 microns have been removed.

The grout B is produced from a still finer slag-based cement.

By way of example, cement C is a relatively fine, commercial product.

The very great fineness of cement B can be seen in the above Table A, where the specific surface has been shown in particular. It is found that such a cement must be mixed with a W/C ratio of at least 1.6.

As can be seen from Table A, the tensile strength TS and compressive strength CS after 28 days are much lower in the case of grout B than in the case of grout A according to the invention.

Furthermore, FIG. 2 shows that the practical useful life at 20° C. is much longer in the case of the product A of the invention than in the case of the product B. In fact, from this graph, in which the ordinates show the Marsh cone flow time in seconds after a time in hours shown as the abscissae, it can be seen that product B becomes practically unusable after 2 h 30 min, while the product A according to the invention can be employed for 6 hours. This is a great advantage in the case of the injection of concrete structures, because it is thus possible to prepare relatively large quantities of grout in advance or deal with a temporary stoppage of the injection procedure.

Figure 3:
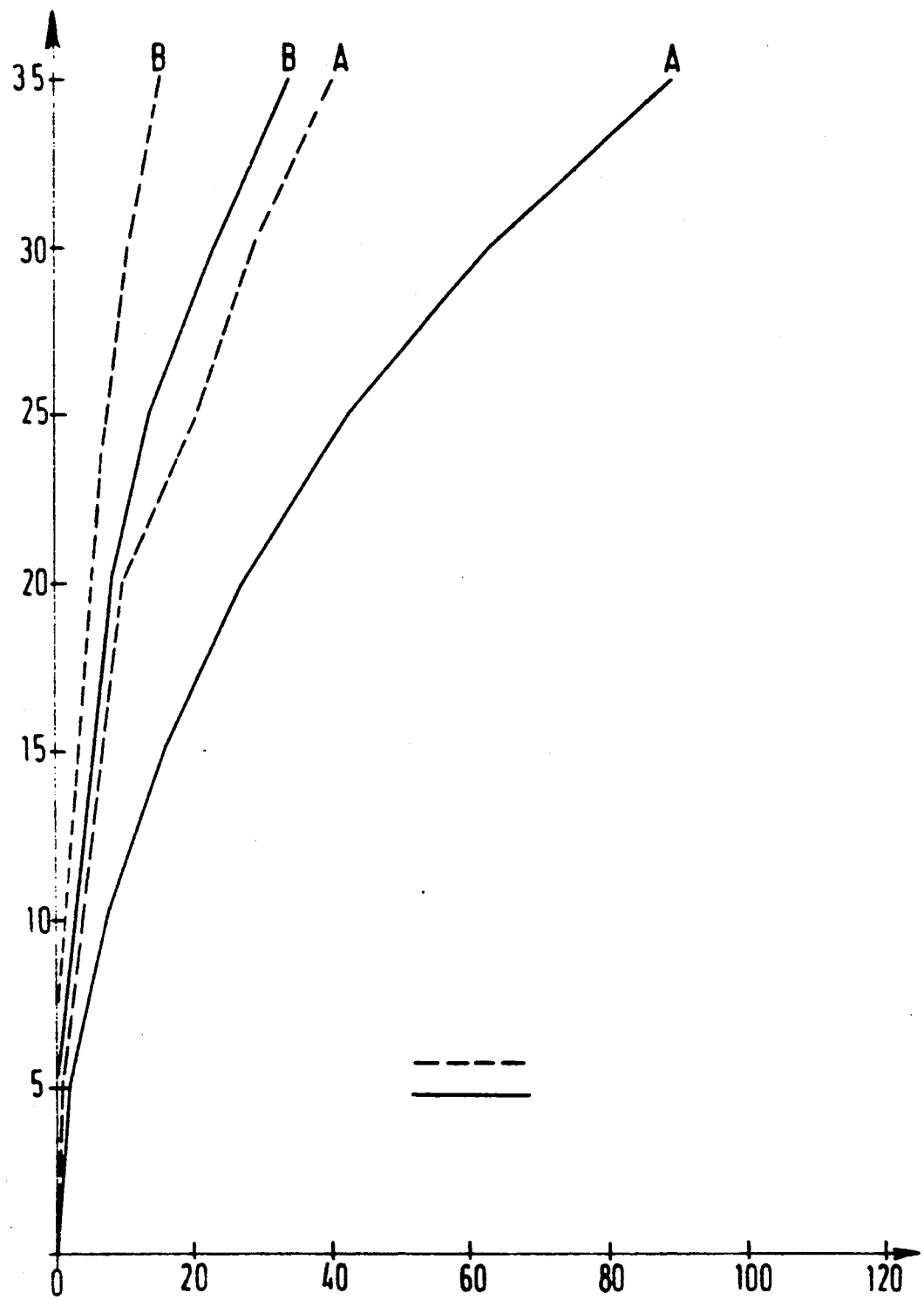
FIG. 3 shows the sand column injectability curves in dry and wet environment, according to NF Standard P 18-891.

In order to evaluate the injection potential of these various products, they were subjected to the sand column injectability test defined by NF Standard P 18-891. The result is shown in the diagram of FIG. 3, which shows the time taken by the grout to rise in the sand column to a height shown as the ordinate.

The injection times in a dry environment and in a wet environment according to NF Standard P 18-891 have been shown for the two grouts A and B. It can be seen that the comparison product B passes through the sand column faster than the product A, but the performance of the latter remains excellent and well below the limits of the Standard in the case of the high penetrability.

Moreover, it is not enough for the product to be easily capable of being injected into the cracks; it must also contribute the required qualities, both in the case of the sealing and in the case of the consolidation.

With regard to the sealing, it has already been seen from the Table A that the porosity of the product A is very low compared with that of the grout B.

Figure 4:
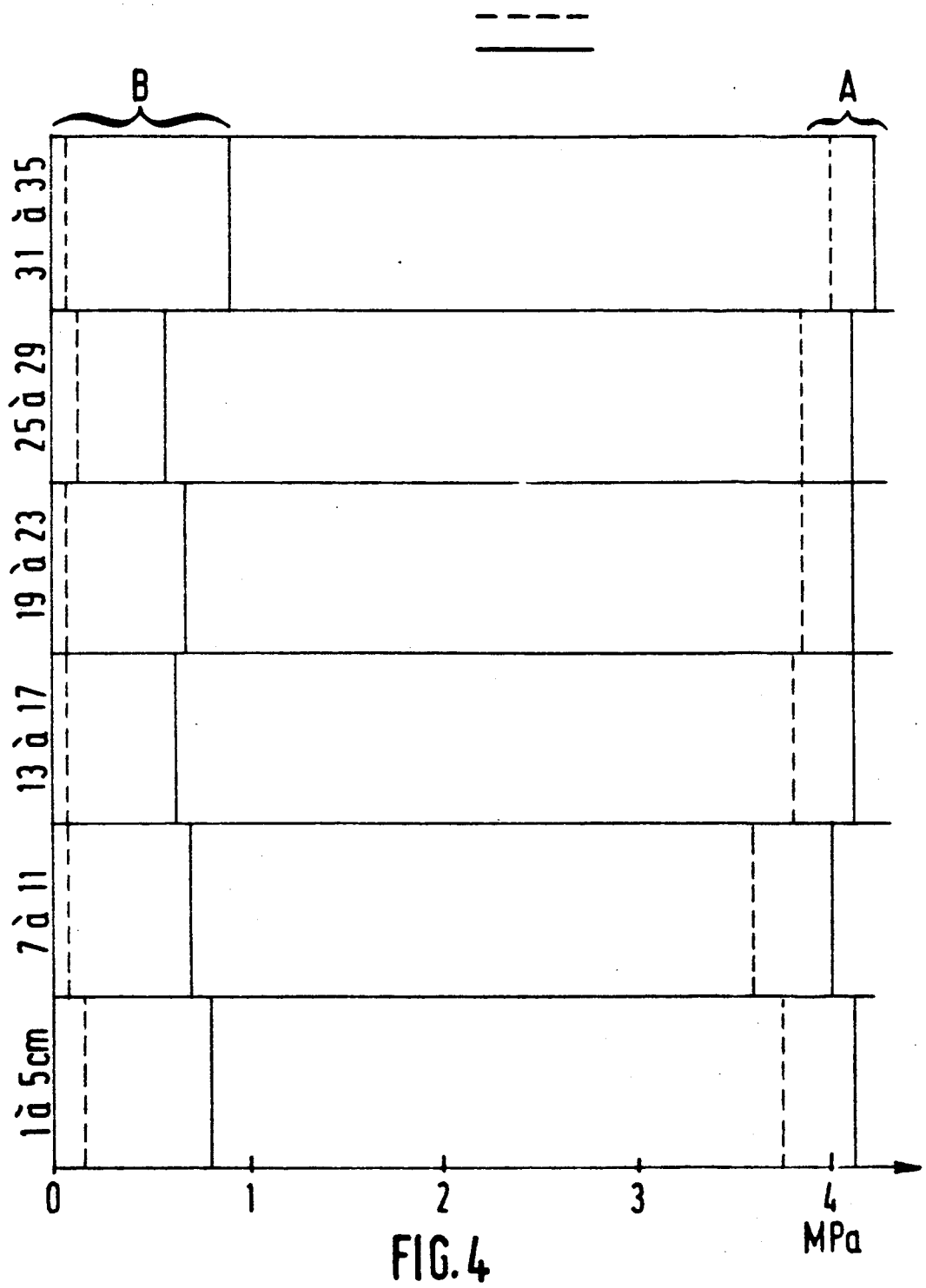
FIG. 4 is a diagram representing the splitting test according to NF Standard P 18-892.

The results of splitting tests carried out according to NF Standard P 18-892 are shown in FIG. 4. The abscissae in the diagram shown the splitting strength ($S_t$) at 28 days, expressed in megapascals, for the six test specimens, obtained from the column. It can be seen that the splitting strength of the test specimens injected with the grout B is practically negligible in a wet environment and very low in a "dry environment", whereas, in both cases, the strengths obtained after injection using the grout A meet the requirements of NF Standard P 18-880 (section 3-2).

To verify the qualities which appear from the tests carried out in this way, both products A and B were, moreover, employed for the regeneration of spongy or cavernous concrete. The results are as shown in Table B below.

TABLE B

| REGENERATION OF A CAVERNOUS CONCRETE | | | |
|---|---|---|---|
| Characteristics studied | Cavernous concrete | after injection using A | B |
| Porosity (%) | >35 | 12.3 | 21.4 |
| Water permeability ($m^3/s$) | $6 \times 10^{-3}$ | $2.6 \times 10^{-11}$ | $2.8 \times 10^{-11}$ |
| Flexural tensile strengths (MPa) | 0.9 | 3.6 | 1.9 |
| Compressive strengths (MPa) | 5.2 | 43.5 | 16.2 |

The characteristics of a spongy or cavernous concrete before and after injection using one of the two grouts A and B are shown in Table B. It can be seen that, in all cases, the injection improves the performance. However, the decrease in porosity is greater after injection using the grout A according to the invention and, above all, the tensile and compressive strengths are much greater after the injection using the grout A.

Finally, Table C below gives the results of an adhesiveness test carried out according to NF Standard P 18-894 and which consists in measuring the breaking load of test specimens of mortar which have been broken and stuck together again with the aid of the injection grout under investigation and then subjected to a flexure test. It can be seen that the performances of grout A are much superior to those of grout B, since, after sticking together again, it is possible to obtain breaking loads which are, to be sure, lower, but which nevertheless remain of the same order as those of the original test specimens.

TABLE.C

| ADHESION TO A CRACK | | | |
|---|---|---|---|
| Characteristics | | A | B |
| W/C ratio | | 0.40 | 1.9 |
| Flexural tensile strength of the grout (MPa) | | 10.5 | 1.0 |
| Bonding 4 × 4 × 16 cm prisms | Before | 10.1 | |
| | After rebonding | 5.4 | 1.3 |

A number of grouts of different compositions, produced from two Portland cements I and II having the following compositions, were subjected to such tests:

| | I | II |
|---|---|---|
| Insolubles | 0.12 | 0.15 |
| $SiO_2$ | 21.68 | 22.95 |
| $Al_2O_3$ | 4.10 | 3.45 |
| $Fe_2O_3$ | 4.12 | 2.50 |
| CaO | 65.17 | 66.60 |
| MgO | 0.74 | 0.90 |
| $SO_3$ | 2.21 | 1.80 |
| $CO_2 + H_2O$ | 1.10 | 0.85 |
| $K_2O$ | 0.28 | 0.38 |
| $Na_2O$ | 0.03 | 0.14 |
| Minor elements | 0.45 | 0.28 |
| TOTAL | 100 | 100 |
| C3A | 3.91 | 4.90 |
| C4AF | 12.52 | 7.60 |

The tests were carried out according to the standards indicated above on sand columns of the following composition:
0.63-0.8 mm: 33%
0.80-1.0 mm: 30%
1.0-1.25 mm: 37%

Table E below shows, for each example:
the proportion and the kind (I or II) of the cement,
the proportion and the kind of the plasticizer: polynaphthalene (P) or melamine (M),
where appropriate, the proportion and the kind of the secondary constituents,
the W/C ratio,
the pourability time (T) in seconds, that is to say the duration of flow in the test specimen,
an indication as to penetrability, (Pen)
the splitting strength $s_t$ in megapascals.

TABLE E

| No. | Composition (%) | | W/C | T (seconds) | Pen. | $S_t$ MPa |
|---|---|---|---|---|---|---|
| 1 | 99.1 0.9 | I P | 0.54 | 70 | high | 4.08 |
| 2 | 99.1 0.9 | I M | 0.50 | 300 | medium | — |
| 3 | 98.5 1.5 | I P | 0.40 | 125 | high | 4.5 |
| 4 | 98.4 1.6 | I P | 0.40 | 90 | high | — |
| 5 | 99.25 0.75 | II P | 0.40 | 242 | medium | 3.52 |

TABLE E-continued

| No. | Composition (%) | | W/C | T (seconds) | Pen. | $S_t$ MPa |
|---|---|---|---|---|---|---|
| 6 | 99.25 | II | 0.40 | 193 | high | 3.80 |
|   | 0.75 | M | | | | |
| 7 | 91.9 | II | 0.40 | 118 | high | 4.54 |
|   | 7.5 | thermal silica | | | | |
|   | 0.6 | P | | | | |
| 8 | 91.9 | II | 0.40 | 144 | high | 4.67 |
|   | 7.5 | silica | | | | |
|   | 0.6 | P | | | | |
| 9 | 91.75 | II | 0.40 | 171 | high | 5.21 |
|   | 7.5 | silica | | | | |
|   | 0.75 | M | | | | |
| 10 | 91.65 | II | 0.40 | 145 | high | 4.06 |
|   | 7.50 | silica | | | | |
|   | 0.85 | M | | | | |
| 11 | 91.60 | II | 0.40 | 131 | high | 3.80 |
|   | 7.50 | silica | | | | |
|   | 0.90 | M | | | | |
| 12 | 91.50 | II | 0.40 | 165 | high | 4.75 |
|   | 7.50 | silica | | | | |
|   | 1.0 | M | | | | |
| 13 | 90.90 | II | 0.40 | 155 | high | — |
|   | 7.50 | Sl* | | | | |
|   | 1.60 | P | | | | |
| 14 | 90.90 | II | 0.40 | 253 | medium | — |
|   | 7.50 | A* | | | | |
|   | 1.60 | | | | | |

S = Thermal silica or fumed silica
Sl = Slag
A = Ash, a pozzolana

Examples 1 to 4 are carried out with cement I and Examples 5 to 14 with cement II.

The plasticizer was a polynaphthalene (P) or a melamine (M), depending on the cases.

In the case of Examples 7 to 12, part of the cement was replaced with silica. The secondary constituent is slag in Example 13 and, in Example 14, fly ash, which is one of the types of pozzolanas.

Other Portland cements could, of course, be employed, the composition of the grout, especially the proportion of plasticizer and, where appropriate, of secondary constituent and the W/C ratio being adapted to the composition of the cement, to the structure subjected to the intervention and to the nature of the intervention, consolidation or sealing.

It is found that both cements have a good injectability. In the case of cement II, its low contents of tricalcium aluminate and tetracalcium aluminoferrite make it very particularly to be recommended for working in sulfate-containing environments.

We claim:

1. Cement-based injection grout for consolidating structures affected by fine cracks, comprising a Portland cement finely ground into cement particles, with removal of, as completely as possible, any cement particles of sizes greater than about 12 microns, a water-reducing plasticizer or thinner and water, wherein the water is present relative to the cement in a weight ratio not exceeding 0.6, and the plasticizer or thinner is capable of being present in a proportion of less than 2%.

2. Injection grout as claimed in claim 1, wherein the plasticizer is selected from the group consisting of polynaphthalenes, melamines and lignosulfonates.

3. Injection grout as claimed in claim 1, wherein the plasticizer is present in an amount between 0.5% and 1.6% by weight of dry product.

4. Injection grout as claimed in claim 1, wherein the water is present relative to the cement in a weight ratio not exceeding 0.40.

5. Injection grout as claimed in claim 1, wherein the cement is coupled with a secondary constituent in a proportion 0.5 to 10% by weight of dry product.

6. Injection grout as claimed in claim 1, wherein the minimum width of the cracks capable of being filled in using the grout may be of the order of 10 to 15 times the maximum size of the cement particles.

7. Injection grout as claimed in claim 1, wherein the cement contains at most 5% of tricalcium aluminate.

8. Injection grout as claimed in claim 7, wherein the cement contains tricalcium aluminate and tetracalcium aluminoferrate in an amount that does not exceed 20%.

9. Injection grout as claimed in claim 3, wherein the secondary constituent is selected from the group consisting of slag, pozzolanas, silica and resins.

10. A process for consolidating a structure made of concrete and affected by fine cracks, comprising injecting under pressure into the cracks, from outside of the structure, a cement grout produced from a Portland cement finely ground into cement particles from which any cement particles of sizes greater than about 12 microns have been removed, the cement having added to it a water-reducing plasticizer or thinner and being mixed with water, wherein the water is present relative to the cement in a weight ratio not exceeding 0.6, and the plasticizer or thinner is capable of being present in a proportion of less than 2%.

11. A process for consolidating a structure made of concrete and affected by fine cracks comprising the steps of:
   preparing a fine cement from a Portland cement by grinding the cement into particles and removing all the particles of sizes greater than about 12 microns,
   preparing a grout by mixing this fine cement with a water-reducing plasticizer and water, wherein the water is present relative to the cement in a weight ratio not exceeding 0.6, and the water-reducing plasticizer is selected from the group consisting of polynaphthalenes, melamines and lignosulfonates, and is present in a proportion between 0.5 and 0.6% by weight of dry product, and
   injecting said grout into the cracks of said concrete structure.

12. A process as claimed in claim 11, wherein the width of the cracks is at least about 0.2 mm.

13. A process as claimed in claim 11, wherein the cracks have a width about 10 to 15 times larger than any of the cement particles.

* * * * *